United States Patent [19]

Upton

[11] 4,303,349
[45] Dec. 1, 1981

[54] METHOD OF MANUFACTURING ARTICLES

[76] Inventor: Albert E. Upton, 7502 Riverbrook, Dallas, Tex. 75230

[21] Appl. No.: 146,109

[22] Filed: May 2, 1980

Related U.S. Application Data

[62] Division of Ser. No. 924,059, Jul. 12, 1978, abandoned.

[51] Int. Cl.³ ............................................. E01F 13/00
[52] U.S. Cl. .................................. 404/6; 52/DIG. 9; 264/294; 264/320
[58] Field of Search ........... 404/6, 7; 52/102, DIG. 9; 264/294, 320

[56] References Cited

U.S. PATENT DOCUMENTS

| | | | |
|---|---|---|---|
| 355,810 | 1/1887 | Brown | 404/7 |
| 2,609,570 | 9/1952 | Danielson | 264/274 |
| 2,816,323 | 12/1957 | Munger | 264/274 X |
| 3,209,662 | 10/1965 | Morton | 404/6 |
| 3,698,290 | 10/1972 | Wallace | 404/7 |

FOREIGN PATENT DOCUMENTS

| | | | |
|---|---|---|---|
| 2211562 | 9/1973 | Fed. Rep. of Germany | 264/DIG. 69 |
| 597433 | 4/1978 | Switzerland | 404/6 |
| 401337 | 11/1933 | United Kingdom | 404/7 |

Primary Examiner—Thomas P. Pavelko
Attorney, Agent, or Firm—Richards, Harris & Medlock

[57] ABSTRACT

In a novel method of manufacturing articles, primarily scrap plastic materials are collected and then melted. The melted scrap plastic materials are then formed into a semi-molten object which is placed between the male and female portions of a die set. The die set is then closed under a predetermined pressure and for a predetermined time to force the semi-molten object into the shape of the article to be manufactured. While the die set is closed under pressure, the article therein is cooled to effect stabilization, following which the die set is opened to allow removal of the article. Articles formed in accordance with the invention are inexpensive and exhibit good structural characteristics and finish.

1 Claim, 11 Drawing Figures

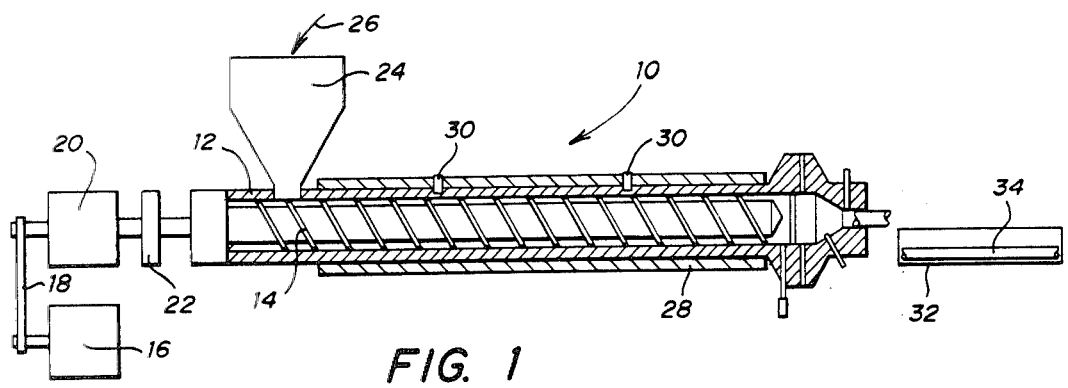
FIG. 1
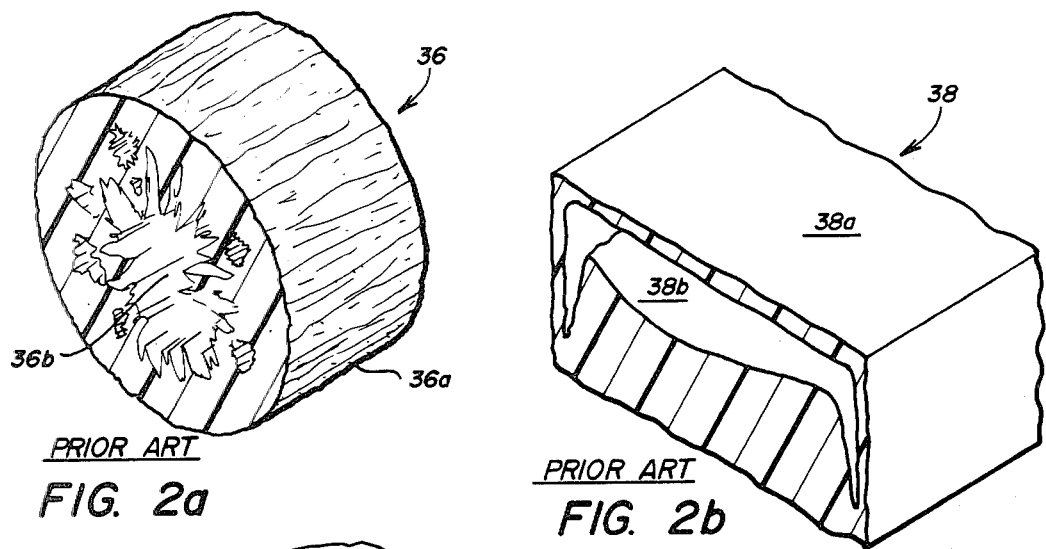
PRIOR ART
FIG. 2a
PRIOR ART
FIG. 2b
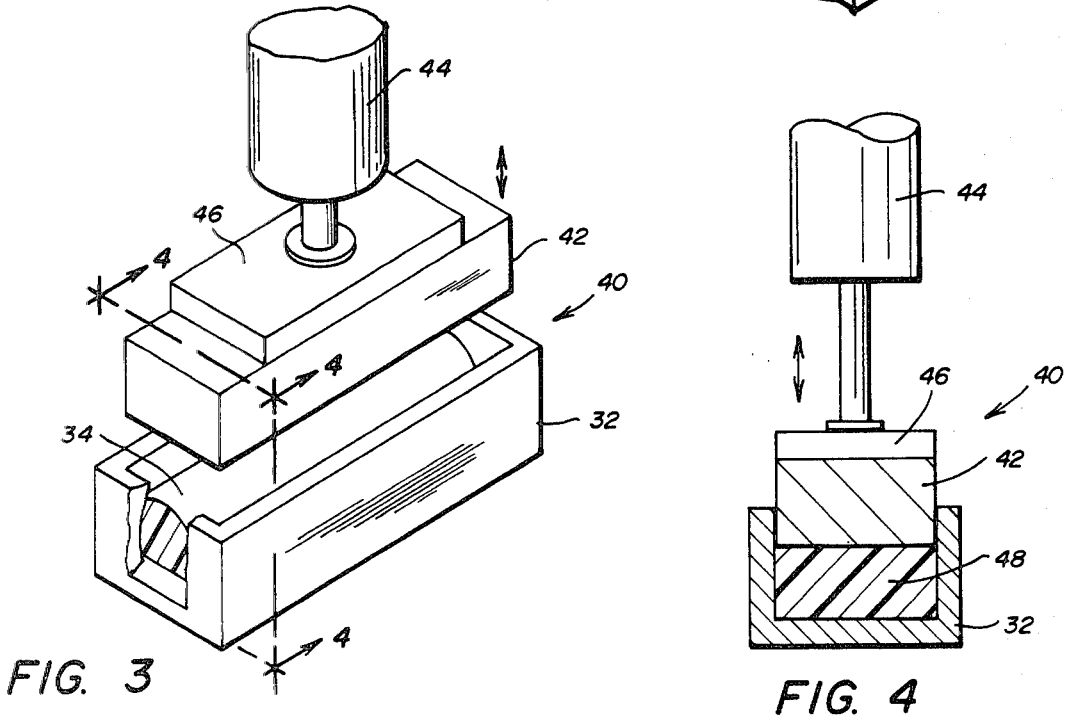
FIG. 3
FIG. 4

METHOD OF MANUFACTURING ARTICLES

This is a division of application Ser. No. 924,059 filed July 12, 1978 now abandoned.

BACKGROUND AND SUMMARY OF THE INVENTION

This invention relates generally to the art of forming articles from plastic materials. More particularly, the present invention concerns a method of manufacturing articles with primarily scrap plastic materials.

Plastic materials enjoy widespread use today because they can be readily formed into various shapes. In addition, plastics are generally less expensive than metals and other materials. Extrusion or some type of molding are the principle techniques for converting plastics into useful shapes. Such techniques typically employ pure plastic material in granulated form, which is melted and then extruded or injected under pressure into a mold cavity where it is allowed to cool. Flash or excess plastic material expelled from the mold is commonly discarded as scrap. Very often such scrap plastic material becomes contaminated with other non-plastic substances such as dirt, oil, and the like. Great quantities of this scrap material is generated. Heretofore some attempts have been made to apply this scrap material to a useful end. Merely extruding or molding scrap plastic material has been unsatisfactory because the resultant articles have suffered from poor strength and porous internal structure. There is thus a need for a method of fabricating structurally sound articles from primarily scrap plastic materials in the company of contaminants.

The present invention comprises a method of manufacturing articles which overcomes the foregoing and other difficulties associated with the prior art. In accordance with the broader aspects of the invention, useful articles are manufactured at significantly less expense from primarily scrap plastic materials. The scrap plastic is first collected for melting. The melted scrap plastic is then formed into a semi-molten object, which is placed into a male and female die set. The die set is then closed under pressure and maintained closed for a set time to force the semi-molten object to flow into the shape of the article to be manufactured. While the die set is closed under pressure, the article is cooled to effect stabilization, after which the die set is opened to allow removal of the article. Articles formed in accordance with the invention are inexpensive and exhibit good structural characteristics and finish.

In accordance with more specific aspects of the invention, there is provided a novel method of manufacturing articles by utilizing primarily scrap plastic materials. Chiefly, scrap plastic materials are utilized, however, the materials can include relatively small amounts of floor sweepings, dirt, sand, rubber, oil and other nonplastic materials without adversely affecting the inventive method. That is, no special processing of the scrap materials is required other than that they are mostly plastic. The primarily scrap plastic materials are first gathered, and they loaded directly into a melting-/discharge device for melting and formation into a semi-molten object. The semi-molten object is preferably discharged directly into the female portion of a die set. The male portion of the die set is then placed over the semi-molten object, after which the die set is closed under a predetermined pressure by a hydraulic actuator, for example. Closing of the die set forces the semi-molten object into the shape of the article to be manufactured. The die set is clamped in the closed position to maintain the pressure on the semi-molten article formed therein. While clamped together, the die set is cooled to cure the semi-molten article into a dimensionally stable, rigid item. Preferably, cooling is accomplished by plunging the closed die set into a fluid bath. After cooling, the die set is withdrawn from the bath and opened to allow removal of the finished article.

DESCRIPTION OF THE DRAWINGS

A more complete understanding of the invention can be had by reference to the following Detailed Description in conjunction with the accompanying Drawings, wherein:

FIG. 1 is an illustration of a conventional extruder useful in the practice of the invention;

FIGS. 2a and 2b are cross sectional illustrations of articles formed in accordance with the prior art;

FIG. 3 is an illustration of a die set useful in the practice of the invention;

FIG. 4 is a sectional view taken generally along lines 4—4 of FIG. 3 in the direction of the arrows;

DETAILED DESCRIPTION

Figure 5:
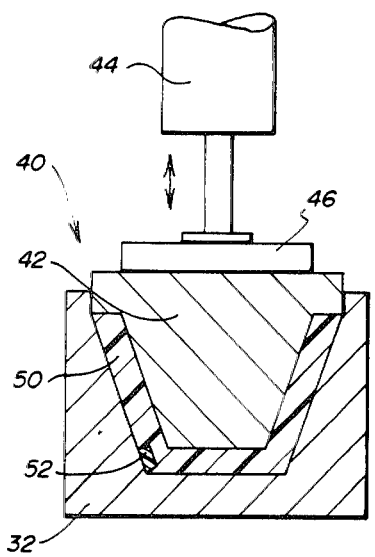
FIG. 5 is a sectional view of another die set useful in the practice of the invention.

Referring now to the Drawings, wherein like reference numerals designate like or corresponding parts throughout the several views, there is illustrated a method of manufacturing articles by means of the present invention. The inventive method herein disclosed features the direct usage of primarily scrap plastic materials, which may be contaminated to a relatively small extent by the presence of nonplastic materials. Use of the invention enables such scrap materials, which might otherwise be discarded, to be employed in the formation of useful articles at significantly reduced expense. The method of the invention results in the formation of articles having good finish and improved structural characteristics.

The first step in the practice of the invention is the collection or gathering of the scrap plastic materials. The scrap materials can comprise suitable thermoplastics. Large amounts of such scrap plastic materials typically result from the operation of conventional molding equipment. The scrap plastic materials can be gathered simply by sweeping, and can include relatively small amounts of grit, sand, sawdust, shavings, oil, moisture, and other particles of nonplastic materials.

It will be understood that the use of scrap plastic materials comprises a significant feature in the practice of the invention. Heretofore, such scrap materials were usually discarded as waste, or considered unsuitable for recovery and further use due to the presence of nonplastic materials and other impurities. The method of the present invention is particularly adapted for utilizing such primarily scrap plastic materials. Examples of suitable plastic materials are polyethylene, polypropylene, copolymers thereof, and mixtures thereof. The presence or absence of relatively small amounts of impurities, such as sand, grit, sawdust, oil and the like, does not adversely affect the use of such scrap plastic materials in the practice of the invention, nor the structural qualities of the article formed therewith.

Referring to FIG. 1, the gathered or collected scrap plastic materials are preferably deposited into an extruder 10 for heating. As used herein, the term 'extruder' means any melting/discharge device which receives suitable material, heats and melts the material, and then discharges the molten material in a form which can be used. A conventional extruder has been found satisfactory in the practice of the present invention, however it will be understood that the material discharged from extruder 10 is not an extrusion in the conventional sense of the word.

The extruder 10 is of conventional construction, comprising a cylindrical body 12 within which screw 14 rotates. Screws 14 is driven by motor 16. Motor 16 is coupled to screw 14 by means of transmission 18, gear reducer 20, and flexible coupling 22. Extruder 10 includes a hopper 24 for receiving the material to be heated and melted. The primarily scrap materials which were previously collected are loaded into hopper 24 of the extruder 10 as indicated by arrow 26.

The material loaded into hopper 24 is thus deposited inside cylindrical body 12 and into engagement with screw 14. As screw 14 rotates, the scrap plastic materials are transported inside body 12, which is surrounded by a heating jacket 28. Preferably, thermocouples 30 are provided on cylindrical body 12 for controlling the temperature imparted thereto by heating jacket 28. It will thus be apparent that material placed in hopper 24 becomes mixed and heated as it is transported through body 12 by screw 14. If desired, additives such as stabilizers, flame retardants, colorants, plasticizers, reinforcing agents, and/or processing aids can be loaded into hopper 24 with the primarily scrap plastic materials in accordance with the particular properties required of the articles formed pursuant to the present invention.

Primarily scrap materials loaded into hopper 24 are thus melted and discharged from extruder 10 in a semi-molten state. In the preferred embodiment, the interal passageway of body 12 is approximately six inches in diameter and terminates in a discharge outlet of approximately four inches diameter. The semi-molten material is discharged having a temperature of between about 450° and 550° F. in the general shape of a tube, and is preferably discharged directly into the female portion 32 of a die set. After a sufficient length of semi-molten plastic material has been discharged into female portion 32, it is severed such as by means of a shear (not shown). The extruder 10 is thus utilized to melt the primarily scrap plastic materials and form the materials into a semi-molten object 34 of predetermined dimensions which is preferably discharged directly into the female portion 32 of a die set. FIGS. 2a and 2b illustrate two objects formed according to the teachings of the prior art. FIG. 2a shows a post 36 formed by extruding molten material comprising plastic and scrap rubber in about equal proportions into a tubular form. Conventional techniques were employed in forming post 36. Because of a lack of sufficient compression, the outside surface 36a of post 36 is rough and uneven, while the interior of the post includes a jagged cavity 36b. FIG. 2b shows a rectangular structural member 38 formed by allowing molten material comprising pure plastic to set in a form under the force of gravity alone. While the outside surface 38a of member 38 is relatively smooth, the inside of the member includes irregular pockets or voids 38b formed by gas trapped therein. Post 36 and structural member 38 both include hollow pockets or voids adversely affecting the structural integrity of the object. As will be discussed hereinafter, the present invention provides a method of manufacturing articles which overcomes the deficiencies of the prior art.

Referring to FIG. 3, the die set 40 comprises female portion 32 and male portion 42. Die set 40 is preferably constructed of metal having a high thermal conductivity. Steel or preferably aluminum are suitable. Following discharge of the semi-molten object 34 by extruder 10 into female portion 32, male portion 42 is positioned thereover. In accordance with the preferred embodiment of the invention, die set 40 is moveably mounted for transport from a region adjacent extruder 10 to a pressing region adjacent double-acting cylinder 44. Cylinder 44 preferably comprises a conventional fluid actuator mounted on suitable stationary structure (not shown) and connected to a suitable source of pressure (not shown). In the preferred embodiment, cylinder 44 is a hydraulic ram developing about 16,000 pounds force. The piston rod of cylinder 44 is coupled to plate 46. The die set 40 having object 34 therein is thus placed beneath cylinder 44 and plate 46 for closure under force to press object 34 into the shape of the desired article.

Referring now to FIGS. 4 and 5, two die sets 40 are shown in the closed positions. The die set 40 of FIG. 4 has forced the semi-molten object into an elongate article 48 of rectangular cross section. The closed die set 40 of FIG. 5 has forced the semi-molten object into an elongate article 50 of cup-shaped cross section. Article 50 shown in FIG. 5 further includes a piece 52 pressed directly therein. If desired, piece 52 can comprise a contrasting member, such as a marker to be formed into article 50, or a projection attached to female portion 32 so that a recess of the desired configuration can be simultaneously formed into article 50 upon closure of die set 40. It will thus be apparent that die set 40 is closed at a predetermined pressure upon semi-molten object 34 to press it into the form of the article to be manufactured.

The female dies of die sets 40 are each characterized by a bottom wall, side walls, and end walls defining an enclosure therebetween. Likewise, the male dies of die sets 40 are each characterized by a bottom wall, side walls, and end walls. In the case of the die set 40 shown in FIGS. 3 and 4, the side walls and end walls of the male and female die members are dimensioned for mating engagement, so that the object 34 is entirely confined between the bottom wall of the male die and the side walls, the end walls, and the bottom wall of the female die. On the other hand, the side walls and end walls of the male die of the die set 40 shown in FIG. 4 are dimensioned substantially smaller than the corresponding walls of the female die. This causes the article 48 to flow between the side walls and the end walls of the male and female dies. The resulting article has a hollow V-shaped cross section which is closed at each end.

Figure 6:
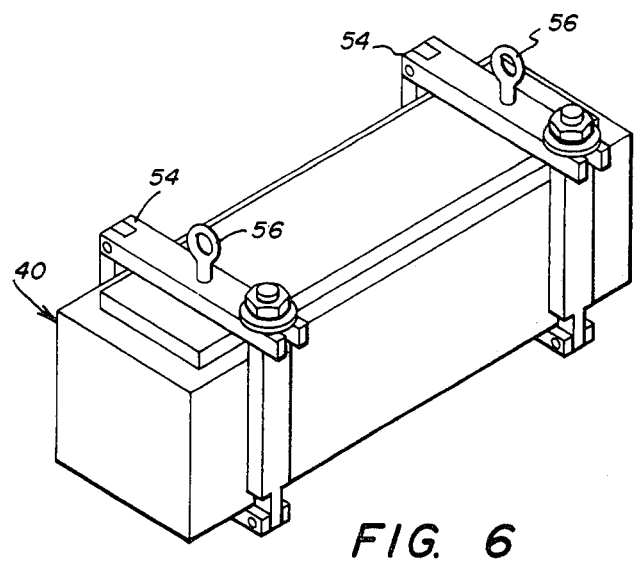
FIG. 6 is an illustration of the die set clamped in the closed position.

Referring to FIG. 6, the die set 40 is next clamped in the closed position prior to retraction of cylinder 44. Two releasable clamps 54, one positioned adjacent each end of die set 40, are secured about the die set so that the warm article 48, 50 is maintained under pressure therein. Conventional clamps of any suitable configuration can be utilized to lock the die set 40 in the closed position. Preferably, each clamp 54 includes an eyebolt 56 or other suitable structure for lifting die set 40 and removing the die set from the pressing region adjacent to cylinder 44 and plate 46.

Figure 7:
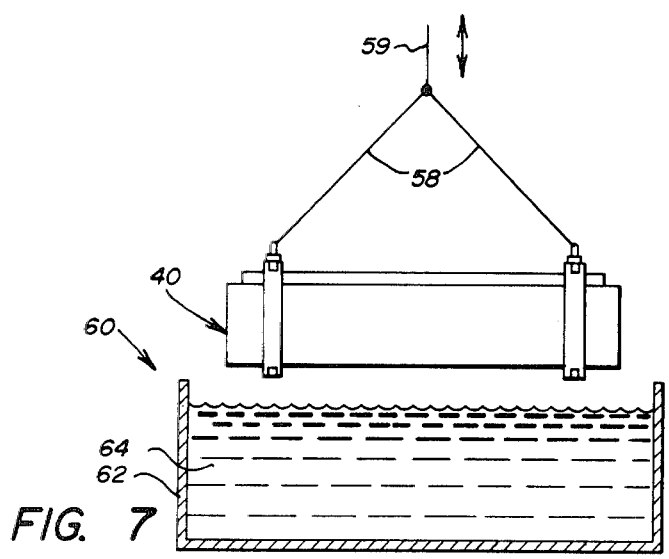
FIG. 7 is an illustration of the step of cooling the closed die set.

Referring to FIG. 7, the closed die set 40 is then lifted by means of cables 58 and 59 connected to eyebolts 56 of clamps 54, and then deposited into a cooling bath 60 comprising a tank 62 filled with chilled fluid 64. Preferably, fluid 64 comprises water chilled to between 36 and 40 degrees F. It will be understood that the entire die set 40 is plunged into bath 60. Immersion of closed die set 40 causes the semi-molten scrap plastic materials comprising article 48, 50 to cool and stabilize. It has been found that rapid cooling of die set 40 helps the formation of a tough skin on article 48, 50. It will thus be understood that article 48, 50 is cooled as it is closed under pressure inside die set 40.

The rapid cooling of closed die set 40, such as by immersion in a cooling bath, to stabilize the article therein while maintained under pressure comprises a significant feature of the invention. After the die set 40 has been immersed in cooling bath 60 for a suitable period of time, the die set is withdrawn and transferred to an unloading area. In the unloading area, clamps 54 are disengaged and removed to permit opening of die set 40. The die set 40 is thus opened to permit removal of article 48, 50.

Figure 8:
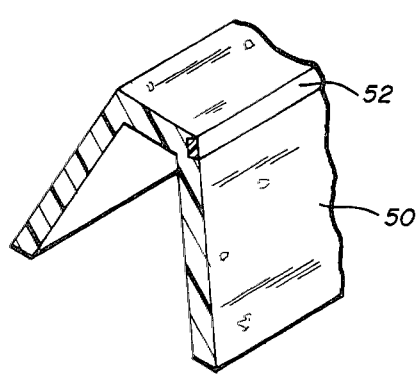
Figure 9:
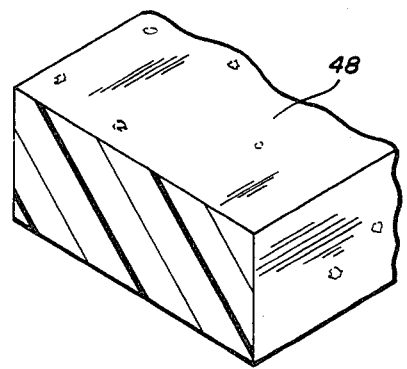

A portion of finished article 50 is depicted in FIG. 8, while a portion of finished article 48 is shown in FIG. 9. It will be noted that articles manufactured according to the present invention exhibit a smooth finish and a solid core free from undesireable cavities. Articles formed in accordance with the invention also have improved strength, and are considerably less expensive because primarily scrap plastic materials are utilized. It will be appreciated that the techniques of the present invention are extremely versatile as well. A wide variety of products can be formed by means of a conventional die set comprised of male and female portions. Article 50 of FIG. 8 is a vehicle wheel stop barrier for use in parking lots and the like. Article 48 of FIG. 9 comprises an elongate structural member, such as a synthetic two by four.

Figure 10:
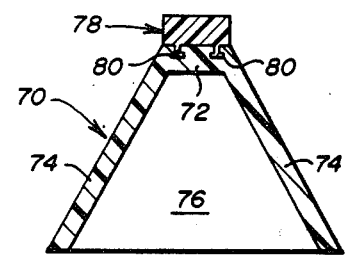
FIGS. 8, 9 and 10 are sectional illustrations of articles formed in accordance with the invention.

Referring to FIG. 10, there is shown an article 70 which may be manufactured in accordance with the invention. Article 70 comprises a vehicle wheel stop having a hollow, generally V-shaped cross section. Article 70 is comprised of a top wall 72, opposed side wall 74 depending therefrom, and opposed end walls 76 extending between the side wall 74 and the top wall 72 to close the interior of the article 70.

Article 70 further comprises a member 78 secured to the top wall 72. Member 78 is preferably of contrasting color from side walls 74. Member 78 comprises a previously extruded article of any desired shape and having a pair of tangs 80 depending therefrom. Tangs 80 may be formed during the extrusion of member 78 and extend the entire length thereof.

Article 70 may be fabricated by placing previously formed member 78 in a die set such as the die set 40 shown in FIG. 5. Thereafter, a semi-molten object, such as the object 34 discussed hereinabove in connection with FIG. 1, is placed between the male and female members of the die set. As the male and female members of the die set are brought together under the action of a hydraulic actuator, for example, the material of the molten object flows around the tangs 80 of the member 78. Upon subsequent cooling, the member 78 is rigidly and permanently secured to the top wall 72 of article 70.

In order to further teach the manner of using the invention, the following specific example is set forth. This example is for purposes of illustration only, and shall not be construed as unduly limiting the scope of the present invention.

EXAMPLE

A vehicle wheel barrier, similar to article 50 depicted in FIGS. 5 and 8, was constructed pursuant to the teachings contained herein. The primarily scrap plastic materials employed comprised about 5 to 10 percent polypropylene, about 90 to 95 percent polyethylene, and a relatively small fraction of nonplastic materials such as grit, sand, sawdust, oil, water, and the like. These scrap materials were collected and fed directly into a conventional extruder device for melting. The extruder discharged a semi-molten substantially circular object of about four inches diameter and approximately 450 to 550 degrees F. The semi-molten object was placed in a die set comprising appropriate male and female portions, which was then closed under a pressure of approximately 80 psi. The die set was clamped under this pressure in the closed position and then completely immersed for approximately 15 minutes in a bath of water cooled to between about 36 and 40 degrees F. Following immersion, the die set was withdrawn from the cooling bath, the clamps were disengaged, and the die set was opened to permit removal of the finished vehicle wheel stop barrier formed therein. The article formed was dense and free of cavities in its core, had the desired finish, and was very strong.

From the foregoing, it will be understood that the present invention comprises a method of manufacturing articles which incorporates numerous advantageous over the prior art. One significant advantage of the invention involves the fact that relatively inexpensive scrap plastic materials are employed to form useful articles. Heretofore, such scrap plastic materials were customarily discarded. Articles formed in accordance with the invention exhibit good internal structure, strength, and finish. Other advantages deriving from the invention will readily suggest themselves to those skilled in the art.

Although preferred embodiments of the invention have been illustrated in the accompanying Drawings and described in the foregoing Detailed Description, it will be understood that the application is not limited to the embodiments disclosed, but is intended to embrace any alternatives, modifications, rearrangements and substitutions of parts and/or elements as fall within the spirit and scope of the invention.

What is claimed is:

1. A wheel stop barrier for automotive vehicles comprising:
a first member having an inverted v-shaped cross section and including upwardly convergent side walls, a normally horizontally disposed top wall interconnecting the upper ends of the side walls and opposed end walls interconnecting the ends of the top wall and the side walls, said walls defining an enclosed hollow space within said first member;
said first member comprising an integral structure formed entirely from remelted scrap thermoplastic material and therefore being inexpensive to manufacture;
said first member being characterized by sufficient structural rigidity to withstand repeated impact by automotive vehicles without significant change in shape;

said first member being further characterized by a predetermined color;

a second member having a second predetermined color characterized by a high visual contrast with respect to the first predetermined color of the first member so as to increase the visibility of the wheel stop barrier; and said second member having a predetermined geometrical configuration and being adapted for contact with the molten scrap thermoplastic material that is used to form the first member so that the molten scrap thermoplastic material flows around the predetermined geometrical configuration of the second member to form a mechanical interlock between the first and second members comprising the wheel stop barrier.

* * * * *